United States Patent [19]

Wall

[11] Patent Number: 5,672,283

[45] Date of Patent: Sep. 30, 1997

[54] APPARATUS AND METHOD FOR MAKING WELDED MESH FORMS

[76] Inventor: Daon Wall, 1569 S. Church, Paris, Tex. 75460

[21] Appl. No.: 526,640

[22] Filed: Sep. 11, 1995

[51] Int. Cl.⁶ .......................... B23K 11/11; B23K 11/36; B21F 27/12; B21F 31/00

[52] U.S. Cl. .......................... 219/56; 219/58; 29/897.34; 140/112

[58] Field of Search .......................... 219/56, 57, 58; 29/897.34; 140/112

[56] References Cited

U.S. PATENT DOCUMENTS

| | | |
|---|---|---|
| 3,370,150 | 2/1968 | Nordgren . |
| 3,561,501 | 2/1971 | Fauteux . |
| 3,678,971 | 7/1972 | Nordgren . |
| 3,752,949 | 8/1973 | Nordgren . |
| 3,939,879 | 2/1976 | Tolliver et al. . |
| 4,911,209 | 3/1990 | Smith et al. . |

FOREIGN PATENT DOCUMENTS 3838841  5/1990  Germany .

*Primary Examiner*—Teresa J. Walberg
*Assistant Examiner*—J. Pelham
*Attorney, Agent, or Firm*—Shaffer & Culbertson; J. Nevin Shaffer, Jr.

[57] ABSTRACT

An apparatus and method for making welded mesh forms (10) having a stationary center beam (12) and an adjustable center beam (14). Two adjustable side beams (36 and 38) and one adjustable bottom beam and clamp (20) are provided so that any number of circular, arched, and/or elliptical wire mesh forms may be created. Once the desired shape has been properly formed by adjustment, a wire mesh (44) is inserted in between the adjustable clamps contained on the beams. A centering/positioning device (62) then grips the mesh along one free longitudinal edge and holds the wire mesh (44) in place as the clamps are clamped to the wire mesh (44) in clockwise sequence. This clockwise sequence adjusts the prerolled wire mesh (44) and creates a perfectly formed wire mesh (44) in the shape and diameter desired. Once clamped in the desired position, the centering/positioning device (62) is withdrawn and welder (32) and transformer (30) in conjunction with dual weld heads (34) are operated sequentially to automatically weld the entire desired length. Once welding is complete, the welder (32) returns to the operator end (46), the clamps are released and cage ejector (42) is utilized to eject the now welded formed wire mesh (44) from the apparatus (10).

10 Claims, 3 Drawing Sheets

APPARATUS AND METHOD FOR MAKING WELDED MESH FORMS

BACKGROUND OF THE INVENTION

This invention relates to an improved apparatus and method for making welded mesh forms.

Both manual and automatically driven mesh forming mechanisms have been known in the art for quite some time. The prior art machines known to the inventor, however, are extraordinarily expensive, complex and difficult to operate. Further, the "fallback" position adopted by many small businesses has been to create mesh cylinders utilizing hand welding with arc welders. This procedure is not only time consuming, and therefore expensive, but also has the added danger of the operator receiving flash burn to the welder's eyes. Further, both manual and "automated" devices for creating welded mesh cages require several individuals to accomplish the desired task.

Thus, there is a need in the art for providing an apparatus and method for making welded mesh forms that is inexpensive and easy to operate and can be operated by a single individual. It, therefore, is an object of this invention to provide an improved apparatus and method for making welded mesh forms accurately, strongly, and dependably so as to meet ASTM requirements, and the like.

SHORT STATEMENT OF THE INVENTION

Accordingly, the apparatus and method for making welded mesh forms of the present invention includes an adjustable mesh former with adjustments to accommodate 12" to 60" diameter unwelded, unformed wire mesh and for the creation of circular, arched, and elliptical wire mesh forms. Additionally, a positioner for securing one loose edge of the unwelded, unformed wire mesh to the adjustable former is provided and once positioned, more than one adjustable clamp is used for sequentially clamping the unwelded, unformed wire mesh around the adjustable former so that slack is taken out of the unwelded, unformed wire mesh as it is formed to a preselected form. A welder then proceeds to sequentially weld the now formed wire mesh throughout its desired length. Once welded, an ejector ejects the now welded wire mesh from the adjustable former and the machine process is ready to repeat.

In a preferred embodiment, a programmable computer for programming welding variables for each wire mesh to be welded is provided. The programmable computer is connected to a resistance welder and the resistance welder has two weld posts so that two wires on the wire mesh are welded at one time.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
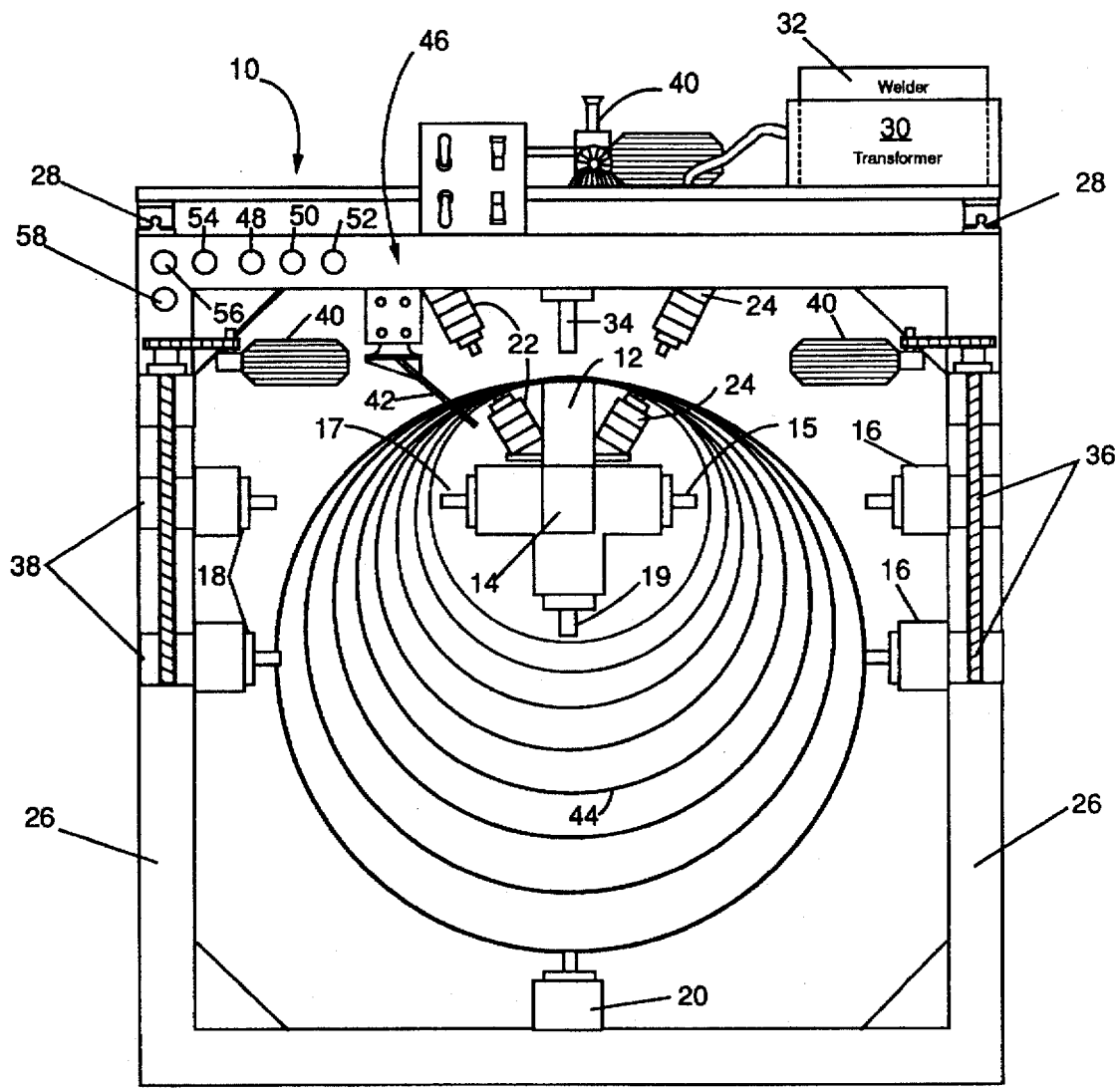
FIG. 1 is an end view of a preferred embodiment of the apparatus for making welded mesh forms of the present invention showing the adjustable side beams moved from a position for making small to a position for making large mesh forms.
Figure 2:
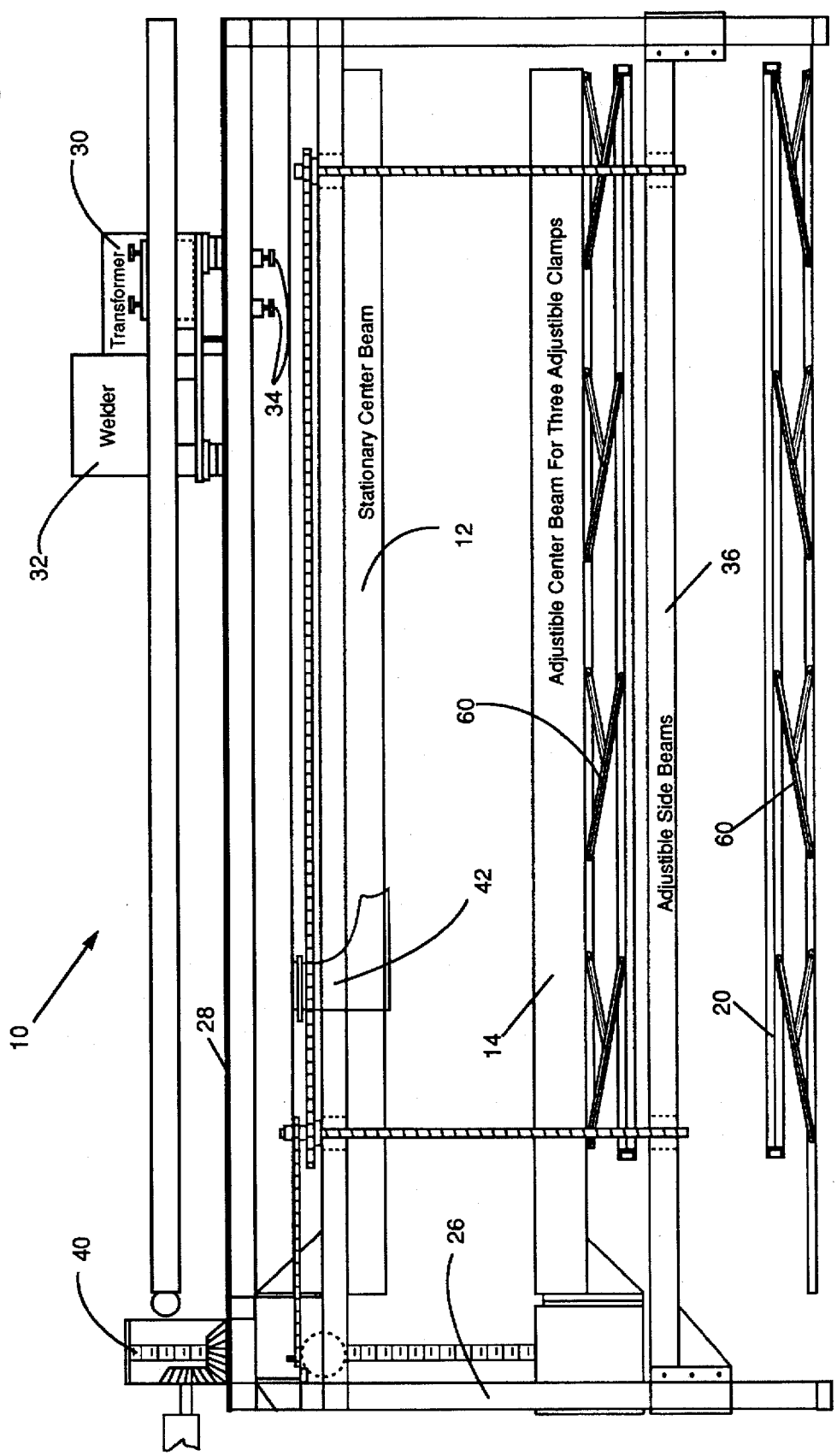
FIG. 2 is a side view of the invention of claim 1.
Figure 3:
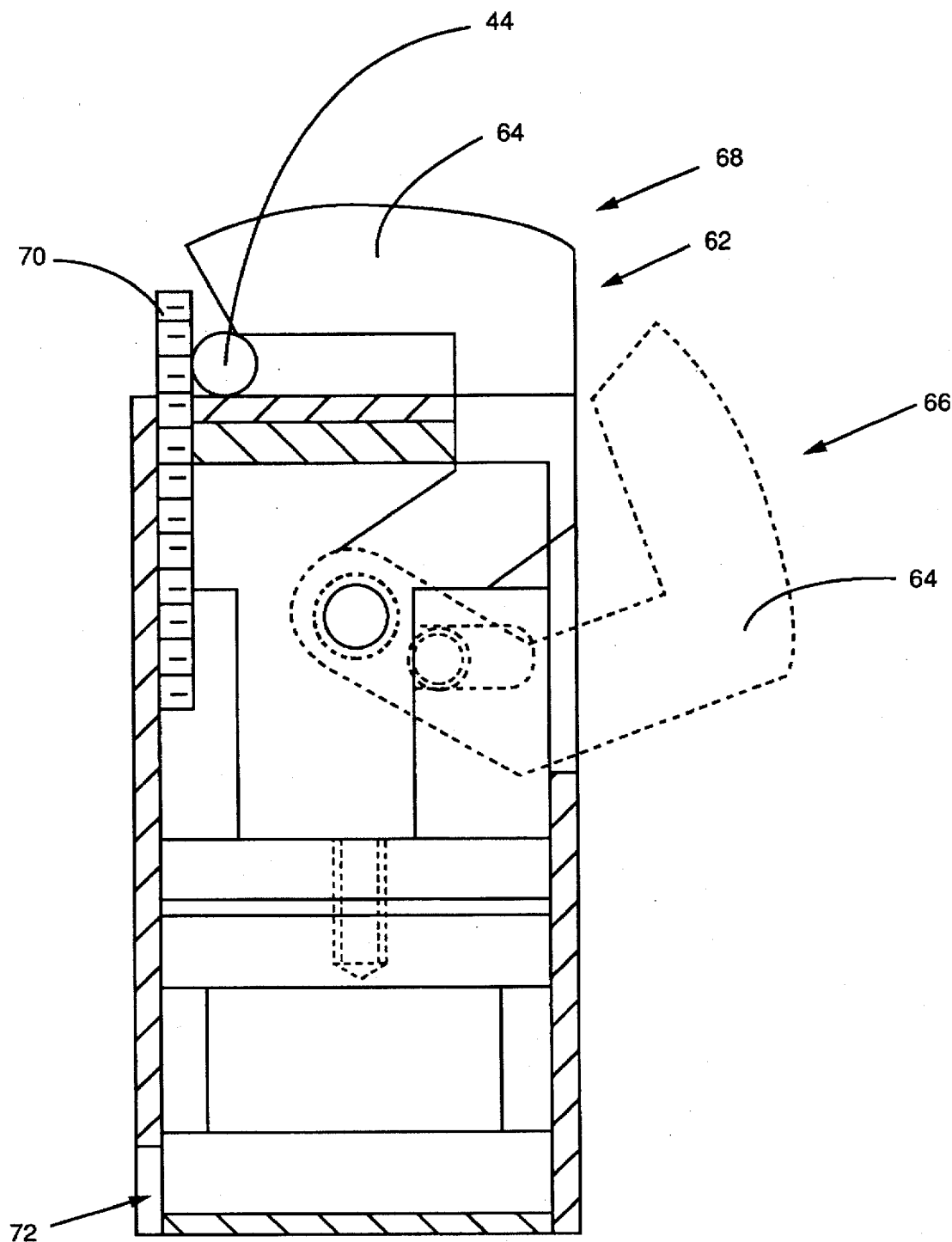
FIG. 3 is a side view of the positioner of the present invention.

The preferred embodiment of the present invention is illustrated by way of example in FIGS. 1–3. With specific reference to FIG. 1, the apparatus for making welded mesh forms 10 includes stationary center beam 12, adjustable center beam 14, adjustable side clamps 16 and 18, adjustable bottom clamp 20, and two adjustable top clamps 22 and 24. Also shown is frame 26, welder track 28, welder transformer 30, welder 32, and weld heads 34. Adjustable side beams 36 and 38 are driven by gear motors 40 for adjusting adjustable side beams 36 and 38 and adjustable center beam 14. Also shown is cage ejector 42 and outlines of formed wire mesh 44 shown from 12" to 60" diameter wire mesh forms.

Additionally, the operator end 46 of the apparatus for making welded mesh forms 10 includes three air switches, positioning air switch 48, clamp closing switch 50 and clamp opening switch 52. Operator end 46 also includes emergency stop switch 54 and automatic weld switch 56 and manual weld switch 58. Adjustable center beam 14 also has adjustable side clamps 15 and 17 and adjustable bottom clamp 19 that cooperate with adjustable side clamps 16 and 18 and adjustable bottom clamp 20 as will be more fully described hereafter.

Referring now to FIG. 2, it is illustrated that welder track 28 runs the length of stationary center beam 12 as does cage ejector 42. This side view also illustrates another preferred embodiment of the apparatus for making welded mesh forms 10 of the present invention wherein welder 32 has double weld heads 34. Additionally, the adjustable nature of adjustable center beam 14, adjustable top clamps 22 and 24, side beam 36 and bottom clamp 20 are illustrated by means of scissor mechanisms 60, known in the art and not disclosed more fully hereafter. By means of scissor mechanisms 60, the center, top, side and bottom clamps can be adjusted in or out depending on the size diameter of the mesh cage required.

Referring now to FIG. 3, centering/positioning device 62 is illustrated. Centering/ positioning device 62 consists of positioning finger 64 shown in the open position 66 and the closed position 68. Positioning finger 64 works in cooperation with catch 70 to hold wire mesh 44 in place for clamping and forming. Centering/positioning device 62 is, in a preferred embodiment, air actuated through a notch 72 for an airline (not shown). Upon activation, positioning finger 64 moves from open position 66 and catch 70 is extended upwardly so that wire mesh 44 is trapped between positioning finger 64 in the closed position 68 and catch 70. Once the wire has been clamped, as disclosed more fully hereafter, positioning finger 64 and catch 70 are released and withdrawn so that welding by welder 32 and weld heads 34 may be accomplished without interference. In a preferred embodiment there are three centering/ positioning devices 62 spaced along the length of stationary center beam 12.

In operation, the apparatus for making welded mesh forms 10 is adjusted to the desired positions to create welded mesh forms of the desired diameter. The purpose of a preferred embodiment of the apparatus for making welded mesh forms 10 is to weld the overlap of a prerolled mesh cylinder to form a continuous circle of mesh steel of varying lengths to be used to reinforce concrete pipe and other related products. Accuracy, strength and dependability are very important to meet the ASTM requirements for the reinforcement mesh, i.e. its welds and the diameter to be placed inside the wall of the pipe to be created.

The accurate diameter for the rolled reinforcement mesh 44 is accomplished by sliding the mesh 44 cylinder onto a circle of adjustable clamps formed by the spaces between the two adjustable top clamps 22 and 24 on stationary center beam 12 at the apex of the circle, a space formed between side clamps 16 and 15, a space formed between bottom clamps 19 and 20, and a space formed between opposite side adjustable clamps 17 and 18. In any event, once the appropriate diameter has been created, and it should be understood that not only circular but arched and elliptical forms are easily created, the prerolled mesh cylinder 44 is slid in between the above-described clamps. At that point centering/positioning device 62 is actuated by operation of positioning air switch 48. Centering/positioning device 62 secures one loose edge of the unwelded, unformed wire mesh to stationary center beam 12. At that point, clamp closing switch 50 is actuated and the above-described clamps are closed in a clockwise direction from centering/positioning device 62 so that all the slack in the steel wire mesh is taken out and a perfectly formed wire mesh form is created. Once the clamps firmly secure the wire mesh 44 in the form desired, positioning air switch 48 is actuated again to withdraw centering/positioning device 62. At that point automatic weld switch 56 is actuated and welder 32 and transformer 30 are moved along track 28 sequentially in any manner known in the art. In a preferred embodiment, the sequential index system is accomplished by electrical/mechanical positioning of the welding head 34 in the horizontal plane. The welding sequence travels 94" moving 6" in one second, with a 1.68 second dwell time between moves. Again, in a preferred embodiment, a PARKER brand controller/drive/motor (PSX 15-83-93) is used in conjunction with a PARKER brand linear actuator (204096 RGB/LHM) appropriately programmed. Software utilized in the preferred embodiment is X-Ware 5.1 brand serial communication and editing software which allows communication with the PARKER products, edits, program files, and uploading and downloading from the computer to the controller (not shown).

The actual weld sequence is controlled, in a preferred embodiment, by an ENTRON EN1000 series multiple schedule/multiple sequence brand controller. Each weld sequence is programmed directly into the controller. A ROMAN F44685B1AAWX brand transformer produces the weld current specified by the ENTRON brand controller. Two flexible weld cables (not shown) carry the current to the weld heads 34. Further, in a preferred embodiment, chilled water produced by a SCHREIBER brand water chiller (1 ton) circulates chilled water through the controller, the transformer 30 and the weld heads 34 to reduce the heat produced by the welding process. During the welding process itself a double impulse is utilized. The first impulse blows off dirt, rust and debris and the second impulse actually makes the weld. Once the appropriate length of mesh 44 has been welded the programmer brings the welder 32 and transformer 30 and weld head 34 back to the starting position at the operator end 46. The entire welding process takes approximately one minute per cage.

Should a wire fail to be welded in mesh 44, manual weld switch 58 can be operated to "jog" the welder to the desired location where a manual weld can be made. After welding is complete and the welder 32 and all have returned to the start position, clamp opening switch 52 is actuated and the now welded cage 44 is released from its clamped position. At this point, cage ejector 42 is operated to move from the far end of formed wire mesh 44 to the operator end 46. As a result, the cage ejector, which takes the shape of a rigid bar, forces the now welded form wire mesh 44 off the apparatus for making welded mesh forms 10. At this time, the cage ejector 42 returns to its starting position at the back of machine and the apparatus for making welded mesh forms 10 is in position to create another formed wire mesh 44 of the same dimension. If the identical dimension is required, again, the entire process should take a minute or less.

While the present invention has been disclosed in connection with the preferred embodiment thereof, it should be understood that there may be other embodiments which fall within the spirit and scope of the invention as defined by the following claims.

What is claimed is:

1. An apparatus for making welded mesh forms comprising:
   a) an adjustable forming means with a stationary center beam around which unwelded, unformed, prerolled wire mesh is placed;
   b) a means for releasably securing one loose edge of the unwelded, unformed, prerolled wire mesh to the adjustable forming means at the stationary center beam until clamped;
   c) more than one adjustable clamp means for sequentially, circumferentially clamping the unwelded, unformed, prerolled wire mesh around the adjustable forming means away from the stationary center beam so that a preselected diameter of the unwelded, unformed, prerolled wire mesh is formed; and
   d) a welding means, movably attached to the adjustable forming means, for welding the wire mesh at the stationary center beam after formed and while clamped.

2. The apparatus of claim 1 farther comprising an ejector means attached to said adjustable forming means so that once welded and released from the adjustable clamp means the welded wire mesh is ejected from the adjustable forming means.

3. The apparatus of claim 2 wherein the adjustable forming means comprises:
   a) adjustments to accommodate any diameter from 12" to 60" for the prerolled wire mesh; and
   b) adjustments to create circular, arched, and elliptical wire mesh forms.

4. The apparatus of claim 3 wherein the welding means further comprises:
   a) a programmable computer for programming welding variables for each wire mesh being welded;
   b) the programmable computer connected to a resistance welder; and
   c) the resistance welder having two weld posts so that two wires on the wire mesh are welded at one time.

5. An apparatus for the creation of welded wire mesh cages utilized for the reinforcement of concrete pipe comprising:
   a) an adjustable former with a stationary center beam with adjustments to accommodate any diameter from 12" to 60" of unwelded, unformed, prerolled wire mesh and for the creation of circular, arched, and elliptical wire mesh forms;
   b) a positioner for releasably securing one loose edge of the unwelded, unformed prerolled wire mesh to the adjustable former at the stationary center beam until clamped;
   c) a plurality of adjustable clamps for sequentially, circumferentially clamping the unwelded, unformed, prerolled wire mesh around the adjustable former away from the stationary center beam so that the unwelded, unformed, prerolled wire mesh is formed to a preselected diameter;
   d) a welder, movably attached to the adjustable former for welding the wire mesh at the stationary center beam after formed and while clamped; and e) an ejector attached to the adjustable former so that once welded and released from the adjustable clamps the welded wire mesh is ejected from the adjustable former.

6. The apparatus of claim 5 wherein the welder further comprises:
   a) a programmable computer for programming welding variables for each wire mesh being welded;
   b) the programmable computer connected to a resistance welder; and
   c) the resistance welder having two weld posts so that two wires on the wire mesh are welded at one time.

7. A method for making welded wire mesh forms comprising:
   a) providing an adjustable former, with a stationary center beam, for receiving and holding unwelded, unformed, prerolled wire mesh;
   b) placing an unwelded, unformed, prerolled wire mesh around said adjustable former;
   c) releasably securing one edge of the unwelded, unformed, prerolled wire mesh to the adjustable former at the stationary center beam;
   d) using clamps starting from the secured edge, sequentially, circumferentially clamping the unwelded, unformed, prerolled wire mesh around the adjustable former until the unwelded, unformed, prerolled wire mesh is secured away from the stationary center beam to form a preselected diameter;
   e) releasing the unwelded, unformed, prerolled wire mesh at the stationary center beam;
   f) activating an automatic welder so that the wire mesh is welded in place at the stationary center beam;
   g) releasing the clamps; and
   h) removing the welded wire mesh.

8. The method of claim 7 further comprising the step of providing an automatic ejector so that after the clamps are released the welded wire mesh is automatically ejected from the adjustable former and the adjustable former is ready, then, to receive another unwelded, unformed, prerolled wire mesh.

9. The method of claim 8 wherein the adjustable former further comprises:
   a) providing adjustments to accommodate any diameter from 12" to 60" for prerolled wire mesh; and
   b) creating circular, arched, and elliptical wire mesh forms.

10. The method of claim 9 further comprising the steps of:
   a) connecting a programmable computer, for programming welding variables for each wire mesh being welded, to a resistance welder; and
   b) creating the resistance welder with two weld posts so that two wires on the wire mesh are welded at one time.

\* \* \* \* \*

UNITED STATES PATENT AND TRADEMARK OFFICE
CERTIFICATE OF CORRECTION

PATENT NO. : 5,672,283
DATED : September 30, 1997
INVENTOR(S) : Daon Wall

It is certified that error appears in the above-identified patent and that said Letters Patent is hereby corrected as shown below:

At Column 1, Line 14, change the word "bum" to --burn--.

At Column 2, Line 22, change the word "rum" to --runs--.

In the Claims:

In Claim 2, first line, change "farther" to --further--.
Claim 5,
Paragraph (b)  second line, please insert a "," between the words "unformed prerolled".

Signed and Sealed this

Second Day of December, 1997

Attest:

BRUCE LEHMAN

Attesting Officer

Commissioner of Patents and Trademarks